United States Patent
Greenspan et al.

(10) Patent No.: US 9,170,716 B1
(45) Date of Patent: Oct. 27, 2015

(54) SYSTEM AND METHOD FOR A DISTRIBUTED GRAPHICAL USER INTERFACE

(71) Applicant: CA, Inc., Islandia, NY (US)

(72) Inventors: Steven L. Greenspan, Scotch Plains, NJ (US); Howard A. Abrams, San Mateo, CA (US); Stanislav Mitranic, Calgary (CA); Gabriel M. Silberman, Hastings-on-Hudson, NY (US)

(73) Assignee: CA, Inc., New York, NY (US)

( * ) Notice: Subject to any disclaimer, the term of this patent is extended or adjusted under 35 U.S.C. 154(b) by 360 days.

(21) Appl. No.: 13/797,888

(22) Filed: Mar. 12, 2013

(51) Int. Cl.
*G06F 3/0481* (2013.01)
*H04L 29/06* (2006.01)
*G06F 3/0484* (2013.01)

(52) U.S. Cl.
CPC .................................. *G06F 3/0484* (2013.01)

(58) Field of Classification Search
CPC ......... G06F 3/00; G06F 3/048; G06F 3/0481; G06F 15/16; G06F 1/1626; G06F 9/4443; G06F 9/44543; G06F 9/541; H04L 29/04; H04L 29/08072; H04L 29/06
See application file for complete search history.

(56) References Cited

U.S. PATENT DOCUMENTS

| | | | |
|---|---|---|---|
| 7,930,362 B2* | 4/2011 | Rumelhart | 709/217 |
| 7,987,472 B2* | 7/2011 | Hager et al. | 719/317 |
| 8,595,308 B1* | 11/2013 | Kloba et al. | 709/207 |
| 2006/0031282 A1* | 2/2006 | Tuttle et al. | 709/203 |
| 2007/0300237 A1* | 12/2007 | Neil et al. | 719/319 |
| 2011/0167333 A1* | 7/2011 | Sakata | 715/234 |
| 2012/0289147 A1* | 11/2012 | Raleigh et al. | 455/3.06 |
| 2013/0031203 A1* | 1/2013 | Bestfleisch et al. | 709/217 |
| 2014/0082155 A1 | 3/2014 | Abrams et al. | |

* cited by examiner

*Primary Examiner* — Xiomar L Bautista
(74) *Attorney, Agent, or Firm* — Coats & Bennett, PLLC

(57) ABSTRACT

A management server in a communications network receives information for display at a plurality of user devices. The information includes multiple user interface components for display on the user devices. Upon receiving the information, the management server identifies the different components and selectively distributes the components to different ones of the user devices based on predefined routing data stored in a memory accessible to the management server.

20 Claims, 7 Drawing Sheets

SYSTEM AND METHOD FOR A DISTRIBUTED GRAPHICAL USER INTERFACE

BACKGROUND

The present disclosure relates generally to computer systems, and more specifically, to systems and methods for distributing components of user interfaces to a plurality of user devices.

The popularity of mobile devices, such as smartphones and similar third generation (3G) devices, has surged recently. Users are now accessing a variety of content via the Internet and other computer networks more than ever before. Along with this rising popularity is a surge in the numbers and types of applications that execute on mobile devices. For example, applications are available that configure the display of a user's cellular telephone or other mobile device to control content displayed on the display of another separate device, such as a desktop computer or a television (TV). By way of example only, the "REMOTE" user application published by APPLE enables a user's iPHONE, iPOD, and iPAD to function as a remote control to control audio and video playback of multimedia content on iTUNES and APPLE TV. MICROSOFT'S XBOX SMARTGLASS application performs similar functions.

However, in most cases, the application that provides the controls comprising the user interface (UI) on the user's mobile device is a custom written control application. That is, the control application is especially created to control a specific user application (e.g., iTUNES or XBOX), to ensure that the control elements fit on a certain size display screen, and is particularly directed to specific interaction use-cases. Moreover, users have little or no choice in configuring the UIs provided by these control applications, which prevents users from employing the display screen on their mobile device to display supplementary information such as alerts.

Other applications are similarly affected. For example, Virtual Network Computing (VNC) applications allow users of different devices to share a single desktop. However, the applications on the desktop being shared by the users are generally written for single users, and as such, cannot properly handle shared control from a plurality of different devices. Thus, as a practical matter, controlling such applications from users' mobile devices can be awkward.

BRIEF SUMMARY

Aspects of the present disclosure provide a system and method for distributing the components of a graphical user interface (GUI) to a plurality of user devices. In one aspect, for example, a Display Management Server (DMS) in a communications network receives a plurality of GUI components for display at first and second user devices, with each GUI component comprising a corresponding component identifier. The GUI components may be associated with a retrieved web page or a user application executing on a remote server in the network, for example, and may be received at the DMS in information sent by an application server, or by one or more user devices that will be used to display the GUI.

Upon receiving the GUI components, the DMS server accesses a view registry to determine how to route the GUI components. Particularly, the view registry stores routing information that maps the component identifiers of the incoming GUI components to the addresses of one or more corresponding devices. The DMS server searches for the component identifiers in the view registry, and upon finding a match, routes the GUI components to the device(s) associated with the component identifier. Note that the received information will typically comprise a plurality of different GUI components. However, as the components are not required to be sent to a single device, first and second GUI components may be routed to, and displayed on, different user devices.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
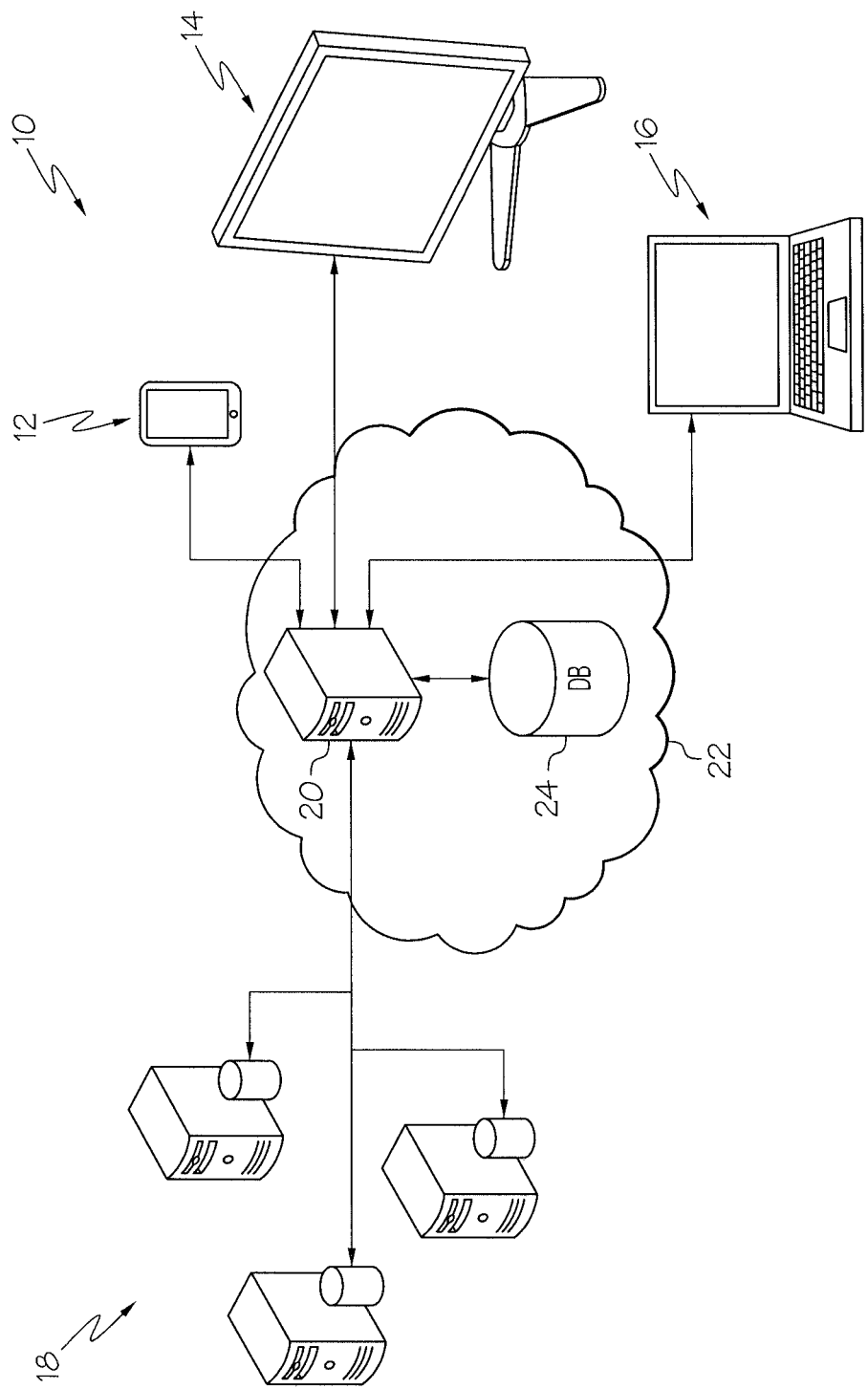
FIG. 1 is a block diagram illustrating a system configured according to an aspect of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Accordingly, aspects of the present disclosure provide a network server and computer-implemented method for distributing the components of a graphical user interface (GUI) over a plurality of end user devices in accordance with a pre-defined distribution scheme. The GUI components may comprise, for example, different elements, pieces of code (e.g., JAVASCRIPT), controls, or panels associated with a user application executing on the application server, or a HyperText Markup Language (HTML) based web page hosted by the application server. Further, the GUI components may be provided by the application server responsive to a request from an end user device, or by one or more user devices that have already requested and received the GUI components from the application server.

The GUI components may be arranged in any manner known in the art, and include, but are not limited to, content such as video, images, and text, as well as the controls used to control the rendering of the content elements. Such controls may comprise, for example, buttons, sliders, and other software-based objects that are displayed on a display and actuated by a user (e.g., by touch) as is known in the art.

In one embodiment, a Display Management Server (DMS) in a network receives the GUI components from the application server. Each GUI component includes a corresponding GUI component identifier. Upon receiving the GUI components, the DMS performs a query into a view registry using the GUI component identifiers as indices. The view registry maps the GUI component identifiers to the addresses of corresponding user devices. Based on the information in the view registry, the DMS then determines which of the end user devices is to display a particular component, and then routes that GUI component to the address of its identified user device for display to the user.

In another embodiment, the GUI components are first received at a user device from an application server. Prior to displaying the GUI components, the user device generates a request message to send to the DMS. The request message identifies the GUI components received by the user device using corresponding GUI component identifiers. Upon receipt, the DMS accesses the view registry, which may or may not be co-located with the DMS, using the GUI received component identifiers as indices. As above, the query results allow the DMS to identify which user device is to receive and display which particular GUI component. Based on this information, the DMS then routes each GUI component to its appropriate end user device for display to the user.

The present disclosure beneficially allows for the configuration of different "views" such that some GUI components of the web page are displayed on the display of a first end user device, while other GUI components of the web page are displayed on the display of a second end user device. Such "views" may be defined by the user, or may be dynamically created and modified based on a learned usage for the GUI components. Additionally, because the distribution of the GUI components is based on information included with the GUI components themselves, the present disclosure requires no additional development of user-level applications executing at the end user devices. Further, the DMS server can be configured to provide backup measures for displaying the GUI components on another device upon detecting the failure of the primary user device.

Turning now to the drawings, aspects of the present disclosure will be described in the context of distributing GUI components received from an application server hosting an HTML-based web page. However, those of ordinary skill in the art should readily appreciate that this is for illustrative purposes only. As previously stated, the present disclosure is not limited solely to receiving and distributing GUI components included in web pages. Rather, as previously described, the present disclosure also provides embodiments in which the GUI components comprise non-HTML components, or comprise code or other elements that are a mix of HTML and non-HTML code.

FIG. 1 illustrates a system 10 configured to operate according to one aspect of the present disclosure. System 10 comprises a plurality of different user devices including a mobile device 12 (e.g., a Smartphone), a display monitor 14 (e.g., a television or a desktop computer display), and a laptop computing device 16 (collectively user devices 12, 14, 16). Those skilled in the art will readily appreciate that the user devices 12, 14, 16 are merely illustrative of the different types of devices that are suitable for use with various aspects of the present disclosure, and that the present disclosure is in no way limited to these devices. Other user devices that are suitable for use with the aspects of the present disclosure include, but are not limited to, audio rendering devices such as home stereos, for example.

As seen in FIG. 1, each of the user devices 12, 14, 16 communicatively connect to one or more application servers 18 via an IP-based communications network 22, such as the Internet, for example. Each of the application servers 18 may host a variety of different web sites comprising a plurality of HTML web pages, and each user device 12, 14, 16 is configured to execute a user-level software application known as a "browser." As is known to those of ordinary skill in the art, browser applications send HTML request messages to an application server 18, and receive HTML response messages from the application server 18. The HTML responses comprise a variety of different GUI components that are processed by the browser application for display at the requesting user device 12, 14, or 16. As stated above, such GUI components may include, but are not limited to, video, images, text, buttons, sliders, links, and the like.

Conventionally, a given user device 12, 14, 16 requests the HTML page from the application server 18, and upon receiving a response, displays all the GUI components for the requested HTML page in a browser window only on the given user device 12, 14, 16. By way of example, consider an HTML page that comprises a video (e.g., an mpeg file) and a plurality of control buttons (e.g., PLAY, REW, FF, PAUSE, STOP) arranged as a "control console" that a user may employ to control the rendering of the video. Conventionally, both the video and the control console would have been displayed on the same device that requested the content. However, when the requesting device is mobile device 12, for example, the display is relatively small making it cumbersome to both view and control the video on the same screen. Further, it is often times difficult to view the video with a group of people gathered around such a small display.

In accordance with aspects of the present disclosure, however, the GUI components contained in the requested HTML page may be selectively distributed to two or more different user devices 12, 14, 16. Therefore, the video component of the requested web page may be routed to a device having a relatively large display monitor, such as user device 14, while the control components that are used to control the rendering of the video are routed to the requesting device (e.g., mobile device 12).

To accomplish such selective routing, aspects of the present disclosure utilize a Display Management Server (DMS) 20 disposed in the network 22. In one embodiment, the HTML responses sent by the application server 18 are first sent to the DMS 20 in network 22. A programmable controller at the DMS 20 processes the HTML responses and identifies each GUI component based on a component identifier that is received with each GUI component in the HTML response. Using the component identifier as an index, the DMS 20 performs a lookup function into a registry maintained in an internal and/or external memory (e.g., database (DB) 24). The registry, as described in more detail below, comprises a mapping of GUI components to user devices. The DMS 20 searches the registry for the component identifier of each GUI component to determine which user device is to display the GUI component, and then routes the GUI component to the identified user device.

Figure 2:
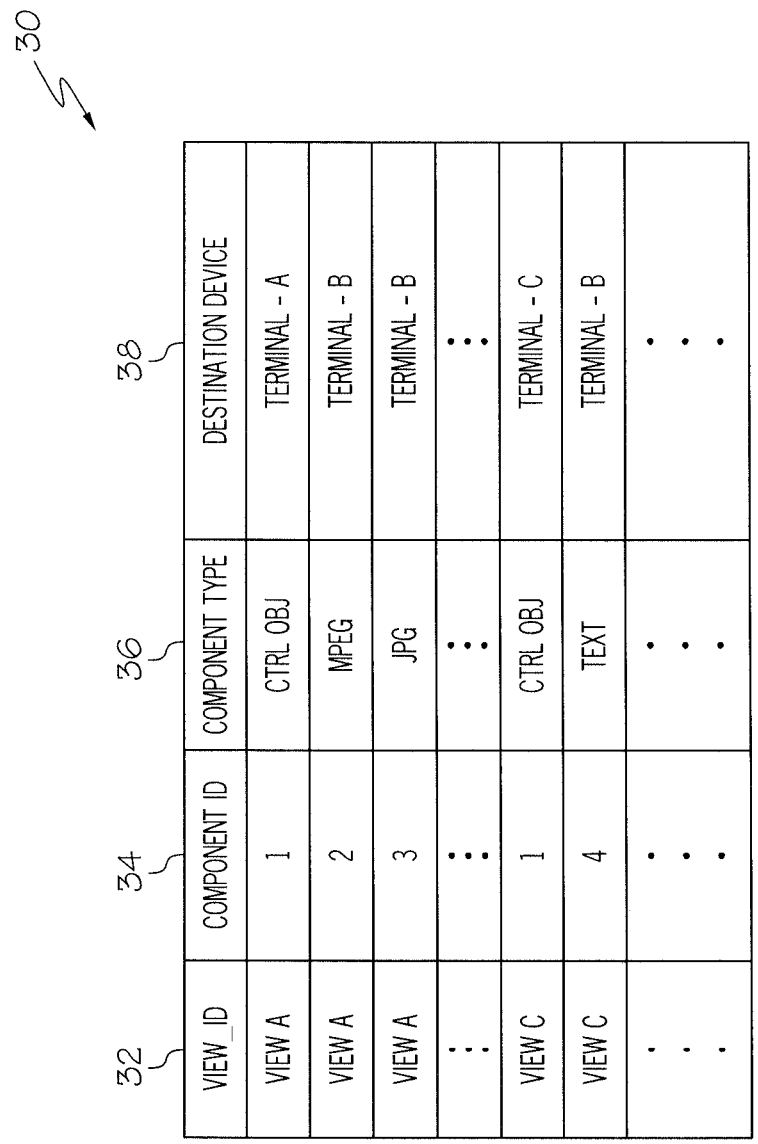
FIG. 2 is a representation of a registry maintained in a memory by a Display Management Server (DMS) in accordance with an aspect of the present disclosure.

FIG. 2 illustrates a registry 30 configured according to aspects of the present disclosure and stored in a memory accessible to the DMS 20. The registry 30 may be generated and maintained using any known means, but in one aspect, registry 30 is created, stored, and maintained, for example, in accordance with U.S. patent application Ser. No. 13/617,066. The '066 application, entitled "User Interface with Configuration, Registration, and Runtime Selection of Views" and filed on Sep. 14, 2012, is expressly incorporated herein by reference in its entirety.

In this aspect, registry 30 is created as a table to comprise four different columns of information that map the component identifiers associated with each of the GUI components received from the application server 18 to a destination device (i.e., user devices 12, 14, 16). These columns are the View ID 32, the Component ID 34, the Component Type 36, and the Destination Device 38. Those of ordinary skill in the art will appreciate that the amount and type of information stored in the registry 30 may vary, but that the underlying function of the registry 30—i.e., to map GUI components to a user device for display—remains the same.

The View ID column 32 is an alphanumeric identifier that identifies a particular "view" generated by the user or by the DMS 20. As defined herein, a "view" is a GUI construct comprising one or more different GUI components arranged in a pre-defined position for the display on a given device. Thus, when GUI components are sent to a specific destination device in accordance with the present disclosure, those GUI components are formatted to appear in a specific position on the display of that device.

The Component ID column 34 stores the values of the different component identifiers that may be received with the GUI components from application server 18. Each Component ID maps to a particular type of GUI component. The different types of GUI components are identified in the GUI Type column 36. In operation, the received component identifiers are used as an index into the registry 30. If a match is found between the value of the received component identifier and the values in the Component ID column 34, the query returns an identifier stored in the corresponding Destination Device ID field 38. This Destination Device ID field 38 comprises an address or identifier that uniquely identifies a given user device 12, 14, or 16. These values may be any values needed or desired, but in one aspect, comprises a Uniform Resource Locator (URL) of a particular user device 12, 14, or 16.

As seen in FIG. 2, the present disclosure allows for a plurality of different pre-defined views, each of which may have the same or similar GUI components, but arranged in a different manner. Thus, in at least one aspect of the present disclosure, the index used in the query to locate a user device for a given GUI component ID 34 in registry 30 also includes an identifier value for a currently selected view. Therefore, a given GUI component such as a control object (e.g., a control button) is routed to "TERMINAL-A" (e.g., user device 12) if the current view is "VIEW A," but is routed to "TERMINAL-C" (e.g., laptop computing device 16) if the current view is "VIEW C."

The number and arrangement of the views on the user devices, as well as the arrangement of the GUI components that comprise the views, may depend on any of a variety of criteria such as the size of the display of a given user device, and/or the type of GUI component (which is identified in the Component Type column 36), and/or the intended interaction with, or use by, a user. For example, a web page requested by a user from user device 12 may comprise a video and corresponding audio, as well as a control console comprised of the control buttons used to control the rendering of the video. For these cases, the user may define a first view in which the video and corresponding audio components are sent to the relatively larger display of user device 14, while the smaller control buttons of the control console (e.g., PLAY, REW, FF, etc.) are sent to the requesting user device 12. Upon receipt of the GUI components at their respective devices 12, 14, the user of user device 12 could use the control buttons displayed at the user device 12 to control the rendering of the video and corresponding audio components of the web page on the larger display of user device 16.

Typically, such control may be effected using pre-defined control signals and/or commands generated by and sent from user device 12 to user device 14 via network 22, as is known in the art. However, where both the user devices 12, 14 are properly configured, the user device 12 may communicate the control signals and/or messages directly to user device 14 utilizing a short-range communications interface (e.g., Infra-Red or BLUETOOTH) established between the two devices as is known in the art.

Figure 3:
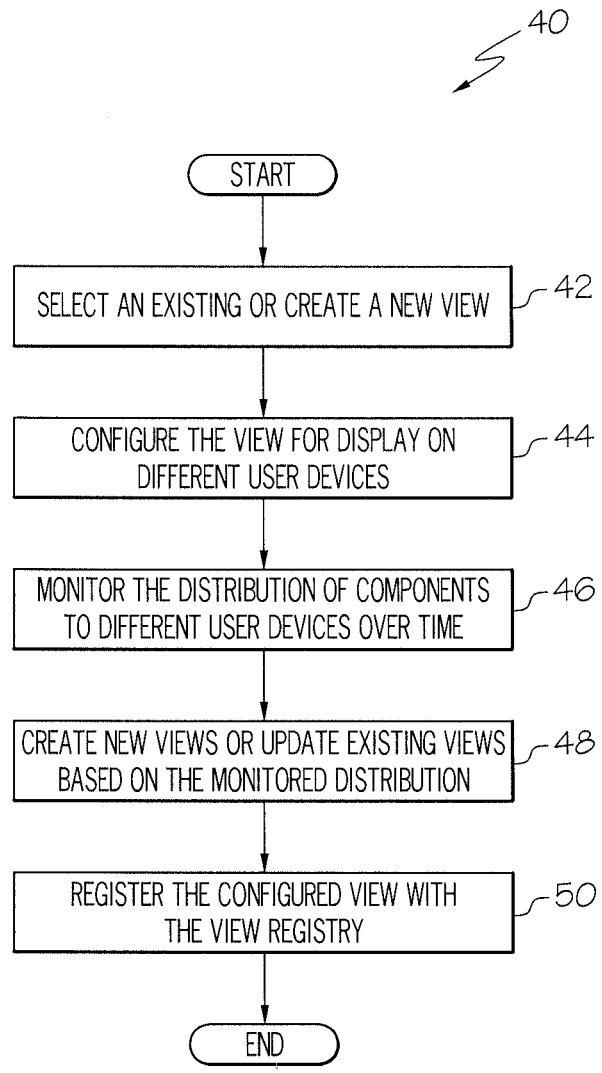
FIG. 3 is a flow diagram illustrating a method of configuring a user interface (UI) on separate devices according to an aspect of the present disclosure.

FIG. 3 is a flow diagram illustrating a method 40 for configuring the registry 30 to map selected GUI components to specific user devices 12, 14, 16 according to one aspect of the present disclosure. Method 40 begins with a user provisioning the registry 30 with the information used to configure different views. More particularly, the DMS 20 may provide a user interface to one of the user devices 12, 14, 16. Using this interface, the user may access the DMS 20 and select an existing view, such as a template or another view that the user could modify, for example, or utilize tools provided with the user interface to create a new view (box 42). The user would then modify or configure the view for display on a plurality of different user devices 12, 14, 16 (box 44). When modifying or creating a view, the user may consider different characteristics of the device that is intended to display the GUI component, such as display screen size for example, or the type of application executing on the device that is intended to render the GUI component. Additionally, the user may specify one or more preferences for the displaying GUI components on a particular device or type of device. By way of example, the user may configure a given view such that all videos and images are displayed on a device having a relatively large monitor, such as display monitor 14, and all control objects are displayed on the user's mobile device 12. In another example, the user may configure a view such that all text in a given HTML page is routed to the laptop computing device 16 for display, and all the controls used to manipulate that text are routed to the user's mobile device 12 for display.

Of course, there are many different configurations for views that may be defined by the user. Additionally, the DMS 20 may monitor how the user typically interacts with web pages (box 46), and autonomously create or modify a given view based on those interactions (box 48). For example, if a control application responsible for routing the GUI components detects that the user typically sends all video to display monitor 14, the control application could create or modify a view for a web site hosting a conference call function such that the video feeds for the remote participants are routed to display monitor 14. The user could, however, change the configuration if needed or desired.

Regardless of the configuration, the user would register the configured view with the view registry 40 when complete. The registry 40 would then be written to a memory structure that is accessible to the DMS 18 (box 50). By way of example, the registry 40 may be written to an internal memory, such as a cache for fast retrieval, or to an external database, such as DB 24. In cases where the registry 40 is stored externally, the control application executing on the DMS 20 may swap portions of the registry 40 in and out of cache according to some well-known algorithm so that the routing information needed for specific users (e.g., those currently active and on-line) remains in the cache for fast retrieval.

Figure 4:
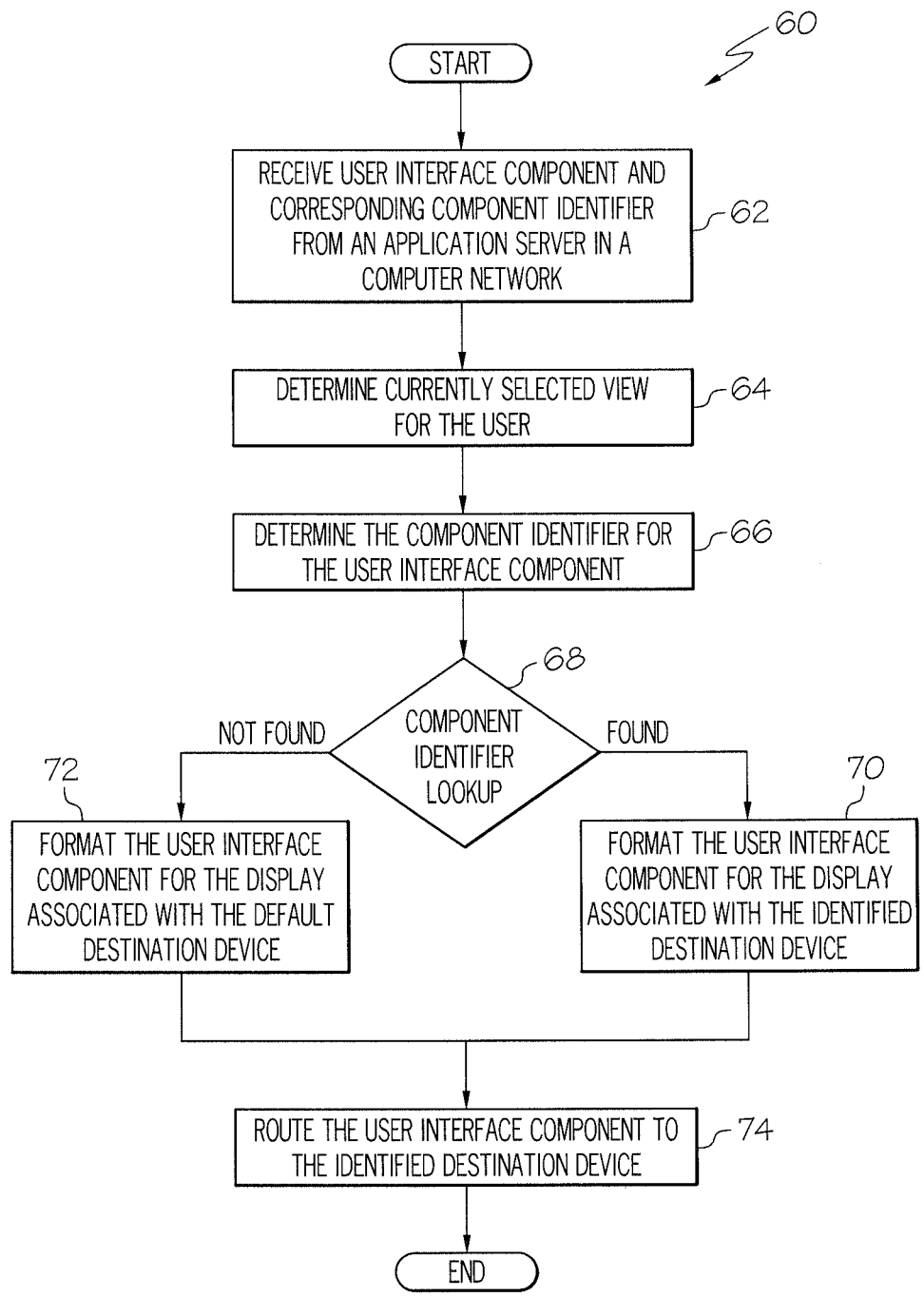
FIG. 4 is a flow diagram illustrating a method of distributing UI components to a plurality of user devices according to an aspect of the present disclosure.

FIG. 4 is a flow diagram illustrating a method 60 for routing the GUI components to a plurality of user devices 12, 14, 16 according to one aspect of the present disclosure. Method 60 assumes that the registry 40 has been configured and is available to the DMS 20, and that an HTML message has been sent by a user device (e.g., mobile device 12) to the application server 18 to retrieve a desired HTML page comprising a plurality of GUI components.

Method 60 begins with the DMS 20 receiving the GUI interface components from the application server 18. As previously stated, each of the GUI components received at the DMS 20 also includes a component identifier (box 62). The DMS 20 then determines the currently selected view for the user (box 64). Such information may be determined, for example, when a user selects a view, and then stored in memory for later retrieval. Once the view has been determined, the DMS 20 determines the component identifier for a given GUI component (box 66). For example, the GUI component identifier may be a value in the HTML page received from application server 18 and associated with the particular GUI component. In operation, the control application executing at the DMS 20 may parse the received HTML to locate a tag for the given component, and then search for the GUI component identifier at a specific place within the HTML code that defines the GUI component. Alternatively, or in addition, the control application at the DMS 20 may be configured to determine a type of component for the given GUI component based on the tag for the GUI component, and assign an identifier for the GUI component from a list of pre-defined GUI component identifiers.

Once the DMS 20 has determined the GUI component identifier, the DMS 20 will perform a look up into the registry 40 to determine a destination device for the GUI component (box 68). For example, as stated above, the DMS 20 may form a query that uses a View ID and a GUI component ID as an index into the registry, and retrieve the Destination Device ID for the particular GUI component. Once retrieved, the DMS 20 may format the GUI component for the size of the particular display associated with the Destination Device ID (box 70).

In one aspect, for example, the DMS 20 creates a new HTML code file for each Destination Device ID that is located in the registry 40. The code in these files will define the GUI component properties and characteristics in the same way that they were received from the application server 18. However, the DMS 20 may alter or modify some of the code to ensure that the GUI components fit on the display of the identified destination device. Thus, where the Destination Device ID corresponds to the mobile device 12, the DMS 20 may process the HTML code associated with the particular GUI component to scale the GUI component for the display size of the mobile device 12. A similar processing function could occur for larger displays, such as those associated with display monitor 14.

In the event that no match is found (box 68), the DMS 20 may format the GUI component for a display that is associated with a default device, such as the user device from which the HTML page was requested (box 72). Once formatted, the GUI components are routed by the DMS 20 to the particular identified user device 12, 14, or 16, as defined in the registry 40 (box 74). Thus, in this manner, some of the GUI components of a given HTML web page may be selectively routed to a particular one of the user devices 12, 14, 16, while others of the GUI components of the given HTML web page may be sent to another of the user devices 12, 14, 16.

Figure 5:
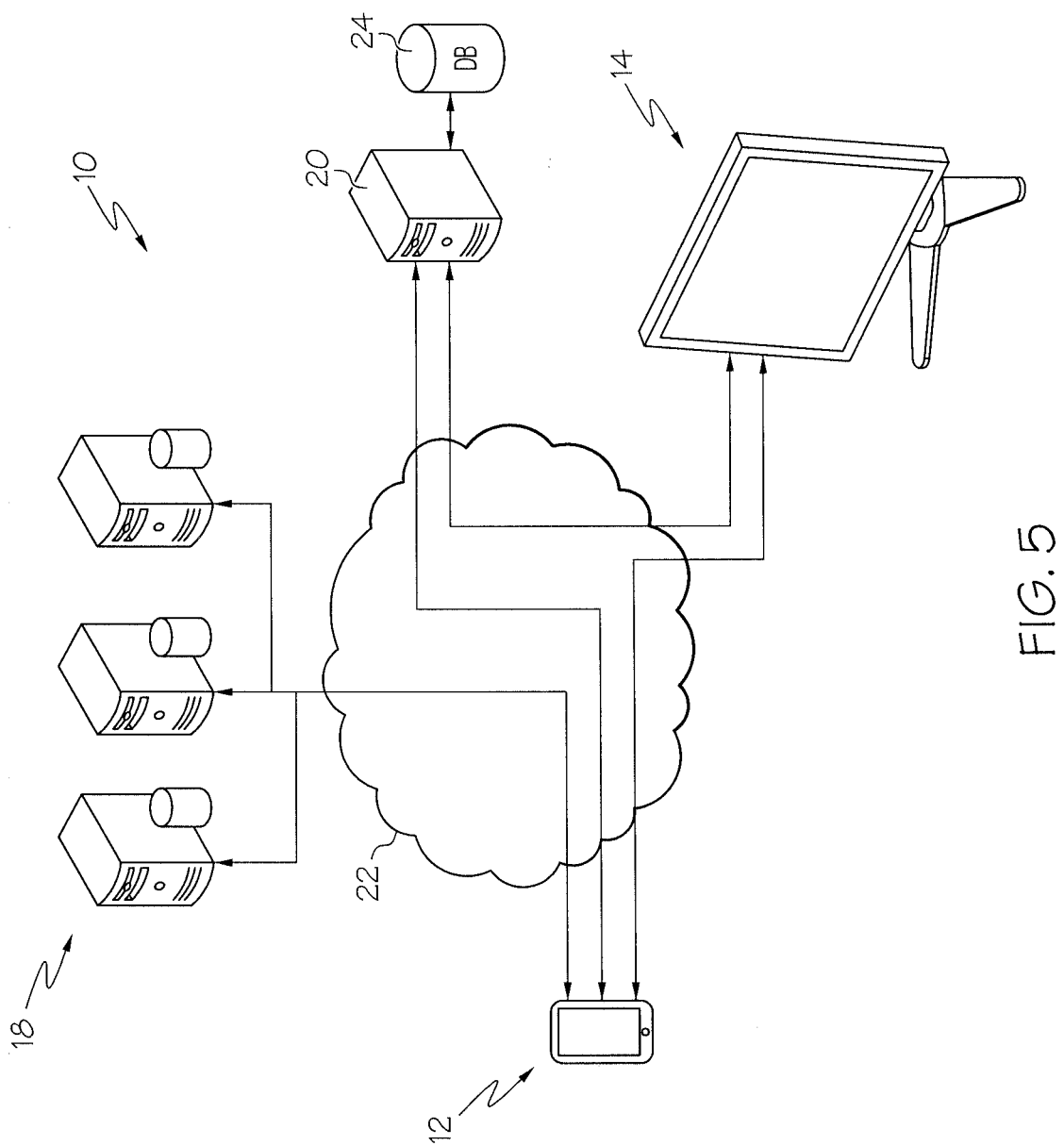
FIG. 5 is a block diagram illustrating a system configured according to another aspect of the present disclosure.

FIG. 5 illustrates another embodiment in which the DMS 20 receives the GUI components from the end user device, such as user device 12, for example, rather than from the application server 18. In this embodiment, the user device 12 may first request and receive an HTML based web page, for example, from the application server 18. Alternatively, the user device 12 may request and receive non-HTML based GUI components from an application executing on the application server 18. However, regardless of the type of GUI components, the user device 12 provides the DMS 20 with the information needed to route the GUI components. Particularly, upon receipt, the DMS 20 queries the view registry 40 to determine where to route the different GUI components. Based on the information contained in the view registry 40, the DMS 20 will either route a GUI component via network 22 directly to a destination user device, such as user device 14, for example, or identify the appropriate device to the requesting user device 12. The user device 12 would then route the GUI component to the destination device (e.g., user device 14) via network 22.

Figure 6:
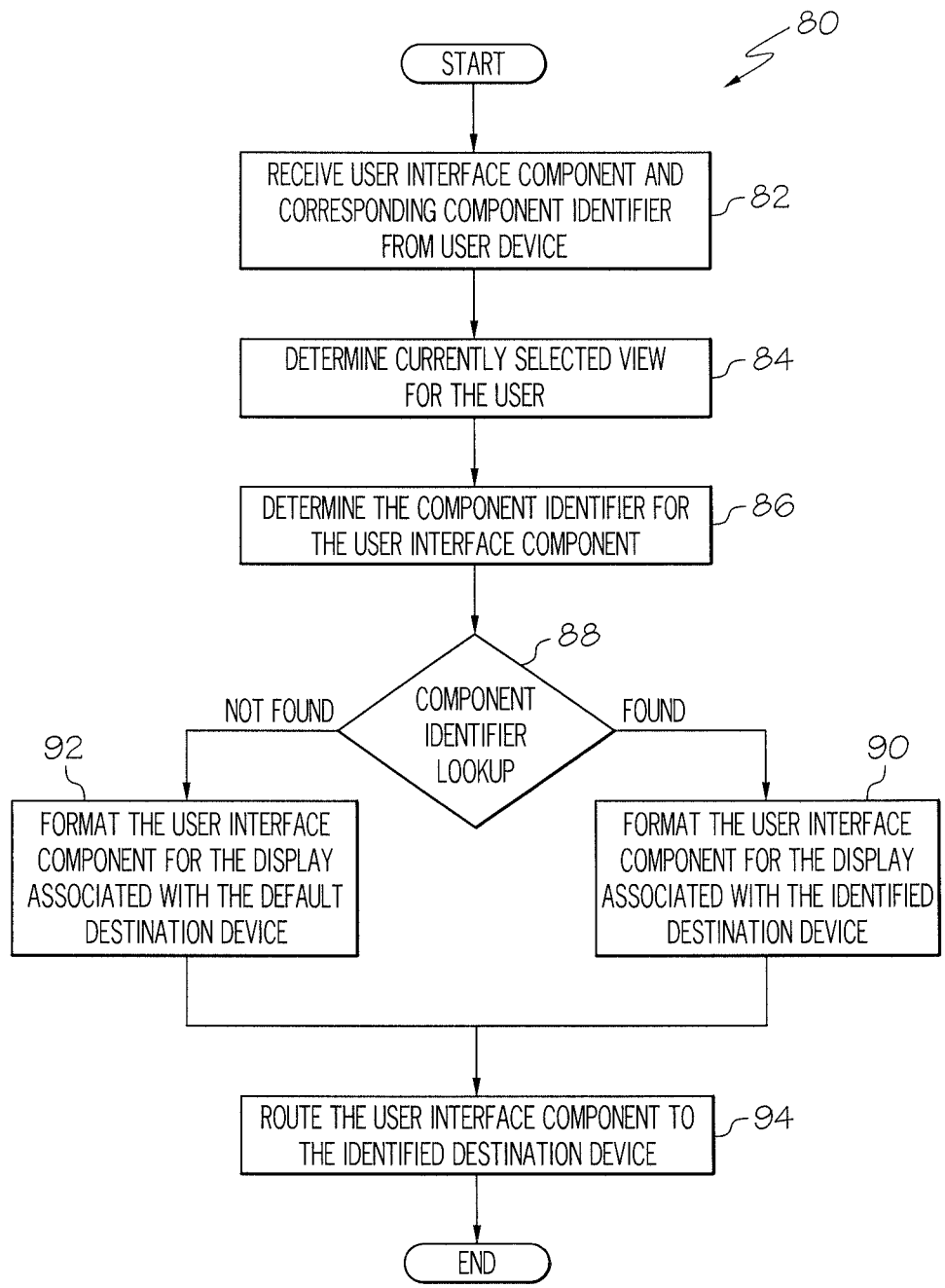
FIG. 6 is a flow diagram illustrating a method of distributing UI components to a plurality of user devices according to another aspect of the present disclosure.

FIG. 6 is a flow diagram illustrating a method 80 for routing the GUI components to a plurality of user devices 12, 14, 16 according to this alternate aspect of the present disclosure. More particularly, for illustrative purposes only, FIG. 6 considers a situation in which user device 12 has requested and received an HTML web page from the application server 18, and will invoke the capabilities of the DMS 20 and view registry 40 to route the GUI components received from the application server 18. As such, method 80 assumes that the registry 40 has been configured and is available to the DMS 20, and that an HTML request message has been sent by a user device (e.g., mobile device 12) to the application server 18 to retrieve a desired HTML page comprising a plurality of GUI components.

Method 80 begins with the DMS 20 receiving the GUI interface components, along with the associated component identifier, from the user device 12 (box 82). Then, as previously described, the DMS 20 determines the currently selected view for the user (box 84). Once the view has been determined, the DMS 20 determines the component identifier for a given GUI component (box 86). For example, as previously described, the control application executing at the DMS 20 could parse the received HTML to locate a tag for the given component, and then search for the GUI component identifier at a specific place within the HTML code that defines the GUI component. Alternatively, or in addition, the control application at the DMS 20 may determine a type of component for the given GUI component based on the tag for the GUI component, and assign an identifier for the GUI component from a list of pre-defined GUI component identifiers. Regardless of how the DMS 20 determines the GUI component identifier, however, the DMS 20 performs a query into the registry 40 to identify a destination device for the GUI component (box 88), as previously stated. If located, the DMS 20 identifies the destination device for the GUI component, and in some aspects, formats the GUI component for the particular display associated with the Destination Device ID as previously described (box 90). However, if no match is found, the DMS 20 identifies a default device for the GUI component, and then formats the GUI component for display on that default device (box 92).

Once formatted, the GUI components are routed, in one aspect, by the DMS 20 to the particular identified user device 12, 14, or 16, as defined in the registry 40 (box 94). In another aspect, however, the DMS informs the requesting user device (e.g., user device 12) of the appropriate destination device. The user device 12 would then route the GUI components to the appropriate device, such as user device 14.

Accordingly, with the aspects of the present disclosure, some of the GUI components of a given HTML web page may be selectively routed to a particular one of the user devices 12, 14, 16, while others of the GUI components of the given HTML web page may be sent to another of the user devices 12, 14, 16. However, in this embodiment, the user device 12 is providing the GUI components rather than the application server 18.

Figure 7:
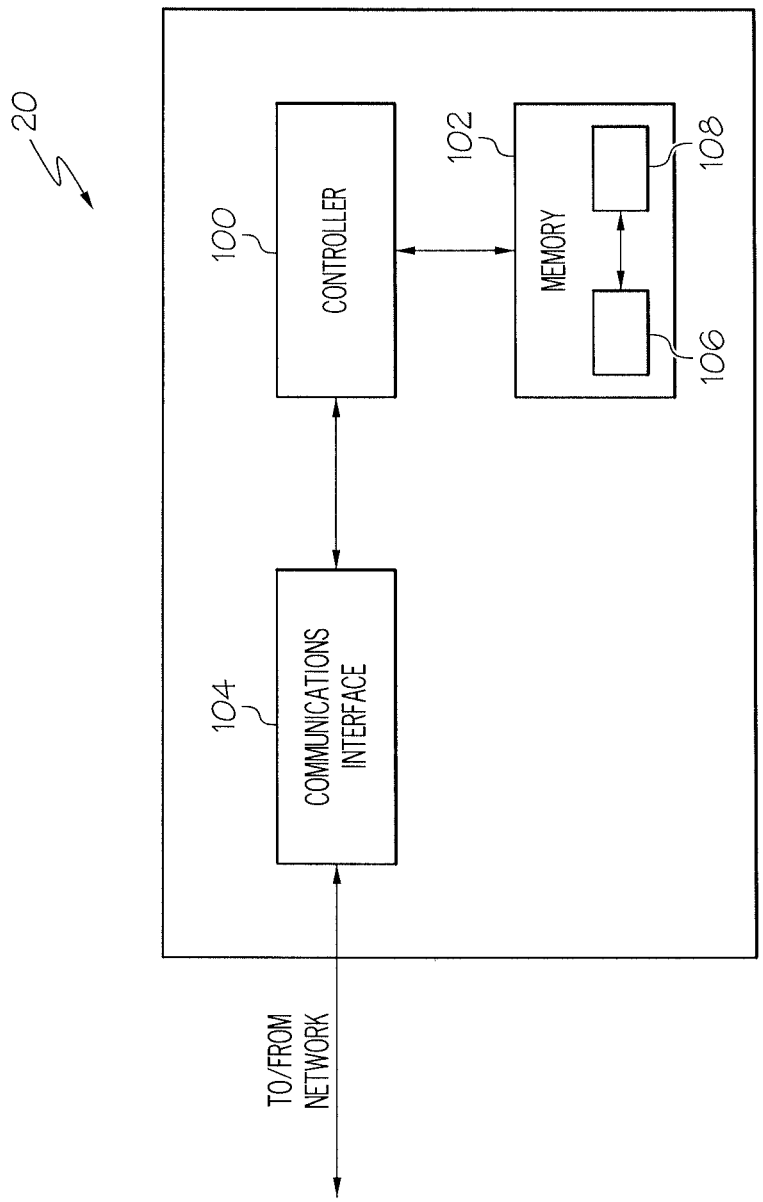
FIG. 7 is a block diagram illustrating some component parts of a DMS configured to operate according to aspects of the present disclosure.

FIG. 7 is a block diagram illustrating some component parts of DMS 20 configured to selectively route GUI components received from an application server 18 to a plurality of user devices 12, 14, 16 in accordance with one or more aspects of the present disclosure. As seen in FIG. 7, the DMS 20 comprises a programmable controller 100, a memory 102, and a communications interface 104. The programmable controller 100 may be implemented by one or more microprocessors, hardware, firmware, or a combination thereof. In addition to the functions performed in accordance with aspects of the present disclosure, the controller 100 is also configured to generally control the operation and functions of the DMS 20 according to appropriate standards. Such operations and functions include, but are not limited to, communicating with the application servers 18 and with the user devices 12, 14, 16.

The memory 102 may comprise any non-transitory, solid state memory or computer readable media known in the art. Suitable examples of such media include, but are not limited to, ROM, DRAM, Flash, or a device capable of reading computer-readable media, such as optical or magnetic media. The memory 102 stores programs and instructions, such as control application 106 and view registry 108. The control application 106, when executed by controller 100, creates and modifies the views in the registry 40, as well as routes GUI components received from the application server 18 to the appropriate user devices 12, 14, 16 as defined by the information contained in the registry 40. The control application 106 may also monitor the user interactions with a plurality of requested HTML web pages over time, and autonomously create or modify an existing view to conform a GUI component distribution with those historical user interactions.

The communications interface 104 comprises a transceiver or other communications interface known in the art that facilitates the communications with both the application servers 18 and the user devices 12, 14, 16. Such an interface may comprise, for example, an ETHERNET component capable of communicating data and information over a communications network as is known in the art. In one aspect, the controller 100, in accordance with the instructions in the control application 106, receives the HTML messages from the application servers 18 via the communications interface 104. The control application 106 then determines a routing for the GUI components, and sends the GUI components (e.g., as a file of HTML code) to the identified user devices 12, 14, 16 via the communications interface 76.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, to blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method comprising:
   receiving, at a management server in a communications network, a plurality of user interface components for display at first and second user devices, each user interface component comprising a corresponding component identifier;
   accessing a registry comprising one or more predefined views, each view mapping one or more user interface component identifiers to a corresponding address of one of the first and second user devices; and
   distributing a first user interface component to the first user device, and a second user interface component to the second user device, based on respective component identifier mappings of the first and second user interface components in the registry.

2. The method of claim 1 further comprising:
   determining a currently active view for displaying the first and second user interface components at the first and second user devices;
   determining whether to send the first user interface component to the first user device or to the second user device based on the component identifier mapping for the first user interface component for the currently active view; and
   determining whether to send the second user interface component to the first user device or to the second user device based on the component identifier mapping for the second user interface component for the currently active view.

3. The method of claim 1 wherein accessing a registry comprising one or more predefined views comprises:
   extracting the first user interface component from information received at the management server; and
   querying the registry using the component identifier associated with the first user interface component as a key.

4. The method of claim 3 wherein distributing a first user interface component to the first user device comprises:
   if the component identifier associated with the first user interface component is found in the registry, routing the first user interface component to the address associated with the component identifier located in the registry; and
   if the component identifier associated with the first user interface component is not found in the registry, routing the first user interface component to the address associated with a default user device.

5. The method of claim 1 further comprising:
   formatting the first user interface component for display on the first user device based on predefined display settings for the first user device; and
   formatting the second user interface component for display on the second user device based on predefined display settings for the second user device.

6. The method of claim 1 further comprising:
   providing a default user interface to one of the plurality of user devices for display to the user;
   receiving user input from the default user interface modifying a selected view in the registry;
   distributing the first and second user interface component to corresponding user devices in accordance with the modified view.

7. The method of claim 1 further comprising:
determining which of the plurality of user devices are currently logged into the management server;
distributing the plurality of user interface components to corresponding user devices based on at least one of:
a known display size for the plurality of user devices;
an application executing on at least one of the plurality of user devices; and
user preferences received from the user.

8. The method of claim 7 further comprising:
monitoring the distribution of the plurality of user interface components over a time period; and
updating the views in the registry based on the monitored distribution.

9. A network-based management server comprising:
a communications interface circuit configured to receive a plurality of user interface components for display at first and second user devices, each user interface component comprising a corresponding component identifier; and
a processing circuit configured to:
access a registry comprising one or more predefined views, each view mapping one or more user interface component identifiers to a corresponding address of one of the first and second user devices; and
distribute a first user interface component to the first user device, and a second user interface component to the second user device, based on respective component identifier mappings of the first and second user interface components in the registry.

10. The management server of claim 9 wherein the processing circuit is further configured to:
determine a currently active view for displaying the first and second user interface components at the first and second user devices;
determine whether to send the first user interface component to the first user device or to the second user device based on the component identifier mapping for the first user interface component for the currently active view; and
determine whether to send the second user interface component to the first user device or to the second user device based on the component identifier mapping for the second user interface component for the currently active view.

11. The management server of claim 9 wherein to access a registry comprising one or more predefined views, the processing circuit is configured to:
extract the first user interface component from information received at the management server; and
query the registry using the component identifier associated with the first user interface component as a key.

12. The management server of claim 11 wherein to distribute a first user interface component to the first user device, the processing circuit is configured to:
determine whether the component identifier associated with the first user interface component is found in the registry;
route the first user interface component to the address associated with the component identifier in the registry if the component identifier is found in the registry; and
route the first user interface component to an address of a default device if the component identifier is not found in the registry.

13. The management server of claim 9 wherein the processing circuit is further configured to:
format the first user interface component for display on the first user device based on predefined display settings for the first user device; and
format the second user interface component for display on the second user device based on predefined display settings for the second user device.

14. The management server of claim 9 wherein the processing circuit is further configured to:
provide a default user interface to one of the plurality of user devices for display to the user;
receive user input from the default user interface modifying a selected view in the registry;
distribute the first and second user interface component to corresponding user devices in accordance with the modified view.

15. The management server of claim 9 wherein the processing circuit is further configured to:
determine which of the plurality of user devices are currently logged into the management server;
distribute the plurality of user interface components to corresponding user devices based on at least one of:
a known display size for the plurality of user devices;
an application executing on at least one of the plurality of user devices; and
user preferences received from the user.

16. The management server of claim 15 wherein the processing circuit is further configured to:
monitor the distribution of the plurality of user interface components over a time period; and
update the views in the registry based on the monitored distribution.

17. A computer program product comprising:
a non-transitory computer readable medium configured to store a control application that, when executed on a management server in a communications network, configures a processing circuit to:
receive a plurality of user interface components for display at first and second user devices, each user interface component comprising a corresponding component identifier;
access a registry comprising one or more predefined views, each view mapping one or more user interface component identifiers to a corresponding address of one of the first and second user devices; and
distribute a first user interface component to the first user device, and a second user interface component to the second user device, based on respective component identifier mappings of the first and second user interface components in the registry.

18. The computer program product of claim 17 wherein the control application further configures the processing circuit to:
identify a currently active view for displaying the first and second user interface components at the first and second user devices;
send the first user interface component to the first user device based on the component identifier mapping for the first user interface component for the currently active view; and
send the second user interface component to the second user device based on the component identifier mapping for the second user interface component for the currently active view.

19. The computer program product of claim 17 wherein the control application further configures the processing circuit to:

extract the first user interface component from information received at the management server; and query the registry using the component identifier associated with the first user interface component as a key.

20. The computer program product of claim 17 wherein the control application further configures the processing circuit to:

determine whether the component identifier associated with the first user interface component is found in the registry;

if the component identifier associated with the first user interface component is found in the registry:
  format the first user interface component for display on the first user device based on predefined display settings for the first user device; and
  route the formatted first user interface component to the address associated with the component identifier located in the registry; and if the component identifier associated with the first user interface component is not found in the registry:
  format the second user interface component for display on the second user device based on predefined display settings for the second user device; and
  route the first user interface component to the address associated with a default user device.

* * * * *